Dec. 1, 1925.　　　　　　　　　　　　　　1,563,723
C. H. CATON
CHANGE SPEED GEARING
Filed Oct. 6, 1923
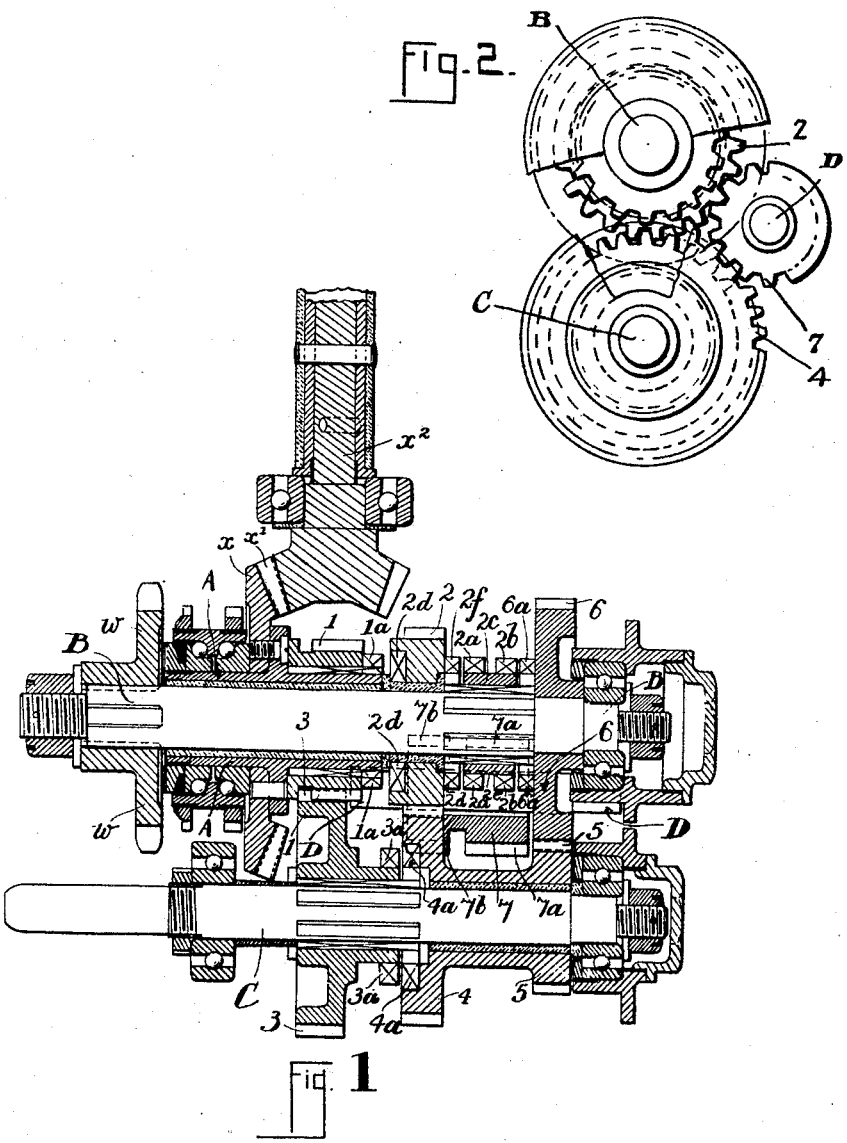
Inventor:
Charles Henry Caton Patented Dec. 1, 1925.

1,563,723

UNITED STATES PATENT OFFICE.

CHARLES HENRY CATON, OF ARMLEY, NEAR LEEDS, ENGLAND.

CHANGE-SPEED GEARING.

Application filed October 6, 1923. Serial No. 666,954.

*To all whom it may concern:*

Be it known that I, CHARLES HENRY CATON, a subject of the King of Great Britain, and resident of 6 St. Ives Mount, Armley, near Leeds, in the county of York, England, have invented a certain new and useful Improvement in Change-Speed Gearing, of which the following description, together with the accompanying sheets of drawings, is a specification.

In the production of toothed driving gear for transmitting motion at four different forward speeds to the wheels of road vehicles and for like purposes, it is desirable in most cases that when the driving shaft is transmitting motion to the driven shaft at the highest speed none of the toothed gearing should be used for transmitting power but should be arranged to run idly so as to avoid wear as is well understood. To attain this object many and varied arrangements of devices have been made use of in all of which it is essential that the axis of the driven shaft should be in alignment with that of the driving shaft.

My present invention relates to a novel arrangement and construction of the clutch mechanism and the gearing wheels in connection with same and consists essentially of mounting three of the gearing wheels upon the counter or lay shaft with one clutch device alone, while the other three gear wheels are mounted upon or in connection with the main driving shaft and have one double clutch and one single clutch arranged in connection with them so that they may be respectively brought into and taken out of use under such conditions that when the double clutch is being moved the other clutches are out of gear and the double clutch has therefore only to engage idly running clutches, while the relative speeds of the clutches in the other gears are so nearly alike that alternative engagements can be made with them without shock.

In order that my said invention may be readily understood, I have hereunto appended drawings illustrative thereof, to which by figures and letters, reference is made in the following description.

Fig. 1 is a sectional plan of my improved driving mechanism in which the main shaft is in the form of a sleeve mounted to run loosely upon a central shaft to which the wheel carried by said sleeve is connected by gearing and clutches hereinafter described.

Figure 2 is an end elevation of parts shown by Figure 1.

In carrying my invention into effect I mount a tubular driving shaft A to rotate loosely upon a liner fixed upon the driven shaft B, so that the said tubular shaft A and the driven shaft B are coaxial. Upon the driving shaft A I fix a bevel gear $x$, which in this instance, derives its motion from another bevel gear $x^1$ mounted upon a main driving shaft $x^2$. The driving shaft A may be driven by any other suitable means, as will be understood.

Splined upon the shaft A is a driving gear 1, which has a clutch part $1^a$ and a peripheral groove to receive an operating fork (not shown), whereby the clutch part $1^a$ may be moved into and out of engagement with a clutch part $2^d$, on a gear wheel 2, which is mounted to rotate loosely on the driven shaft B. When the gear is in the position shown by Figure 1, it engages only a gear 3, which is splined upon a lay or counter shaft C.

On the driven shaft is mounted gear 2, and at the side thereof, farthest from the gear 1, is mounted a double clutch $2^c$ which is splined upon the said driven shaft B and may be slid by a fork taking into its central groove so that its clutch part $2^a$ may engage with the clutch $2^f$ on the wheel 2 or its clutch part $2^b$ may be made to engage with a clutch part $6^a$ on a gear 6 mounted to run loosely upon the driven shaft B.

Engaged with the lay or counter-shaft C, to slide thereon and rotate therewith, is mounted a gear 3 which is operated by its shifting fork taking into a groove so that its clutch part $3^a$ will engage with the clutch $4^a$ on a gear 4, which is connected by a sleeve or hub to a gear 5. The gears 4 and 5 are mounted to rotate loosely upon a liner carried by the lay or counter-shaft C. The said gear 4 is in mesh with the gear 2, while the gear 5 is in mesh with the gear 6.

Parallel with the shafts B and C is another shaft D (Figure 2) upon which a grooved pinion 7 is mounted to slide, said pinion rotating with the shaft D. This grooved pinion 7 is of considerable width in order to enable it to be slid over its shaft so that the part $7^a$ will engage with the gear 2 while the part $7^b$ will engage with the gear 3.

By the arrangements of the gears as above described when the motions of the tubular shaft A have to be transmitted direct or at the highest speed to the driven shaft B, which has means such as a chain wheel $w$ mounted upon it for transmitting motion to the vehicle the gear 1 is slid from its position shown by Fig. 1 so that its clutch part $1^a$ will engage with the clutch part $2^d$ of the gear 2 and at the same time the double clutch $2^c$ is moved so that its clutch part $2^a$ will engage with the clutch part $2^f$ on same wheel 2, hence the sleeve or main driving shaft A is connected directly by these parts to the driven shaft B by which means said driven shaft will be rotated at the highest or fourth speed.

By moving the gear 1 upon the main driving shaft A so that it is brought to engage with the gear 3 alone, and by then moving the gear 3 so that its clutch part $3^a$ will engage with the clutch part $4^a$ on the gear 4 while the double clutch $2^c$ is moved to cause its clutch part $2^a$ to engage with the clutch $2^f$ of the gear 2 then motion is transmitted at the next lower or third speed.

By again moving the gear 1 so that its clutch part $1^a$ will engage with the clutch part $2^d$ on the gear 2 and at the same time by moving the double clutch part $2^c$ so that its clutch $2^b$ will engage with the clutch part $6^a$ on the gear 6, motion is transmitted through the gears 1, 2, 4, 5 and 6 to the driven shaft B and this will be at the next lower or second speed.

By moving the gear 1 back out of engagement with the gear 2 and moving the gear 3 so that its clutch part $3^a$ will engage with the clutch part $4^a$ and on the gear 4 and by keeping the clutch part $2^b$ of the double clutch $2^c$ in engagement with the gear 6 then we have the gear 1 transmitting motion through the gears 3, 4, 5 and 6 to the driven shaft B which is the lowest or first speed.

To reverse the direction of motion of the shaft B the clutches are arranged so that the gear 1 will drive through the gear 3 to the gear 7 which on such occasion will be slid from the position shown by Fig. 1 so that its toothed part $7^b$ will be in engagement with said gear 3 while its toothed part $7^a$ will be in engagement with the gear 2 so that at this time the gear 1 will rotate the gear 3, this will rotate the gear 7, which in turn will rotate the gear 4. This gear 4 rotates the gears 5 and 6 in order that through the clutch parts $6^a$ of the gear 6 and $2^b$ of the double clutch $2^c$, motion may be transmitted in the reverse direction to the driven shaft B in the arrangement of the gears as shown by Fig. 1. When the gears are arranged as shown by Fig. 2 then the engagement of the parts $7^a$ and $7^b$ of the wheel 7 are with the wheels 4 and 1 as is hereinbefore explained.

In order to operate or actuate the shifting or moving forks for the various wheels and clutches I make use of the mechanism described in the specification of my British Patent No. 192,218, dated November 16, 1921.

Such being the nature and object of my said invention, what I claim is:—

1. In four-speed gearing, in combination, a countershaft, three gear wheels, one slidable on and rotatable with said countershaft, and the other two loose thereon and connected to rotate in unison, a single clutch situated between the slidable wheel and one of the loose wheels, a main driving shaft, a driven shaft coaxial with the driving shaft, three other gear wheels, one fixed to the driving shaft and the others loose on the driven shaft, a double clutch between said loose wheels, a single clutch arranged between one of said loose wheels and said fixed wheel, and means for operating said clutches.

2. In four-speed gearing, in combination, a counter-shaft, three gear wheels, one slidable on and rotatable with said countershaft, and the other two loose thereon and connected to rotate in unison, a single clutch situated between the slidable wheel and one of the loose wheels, a driving shaft, a driven shaft coaxial with the driving shaft, three other gear wheels, one fixed to the driving shaft and the others loose on the driven shaft, a double clutch between said loose wheels, a single clutch arranged between one of said loose wheels and said fixed wheel, a third shaft parallel with the driving shaft and the counter shaft, and a gearing wheel slidable on and rotatable with the third shaft, and adapted to mesh with gears on the counter-shaft and the driven shaft to effect a reversal of the rotation of said third shaft.

CHARLES HENRY CATON.